Figure 1:
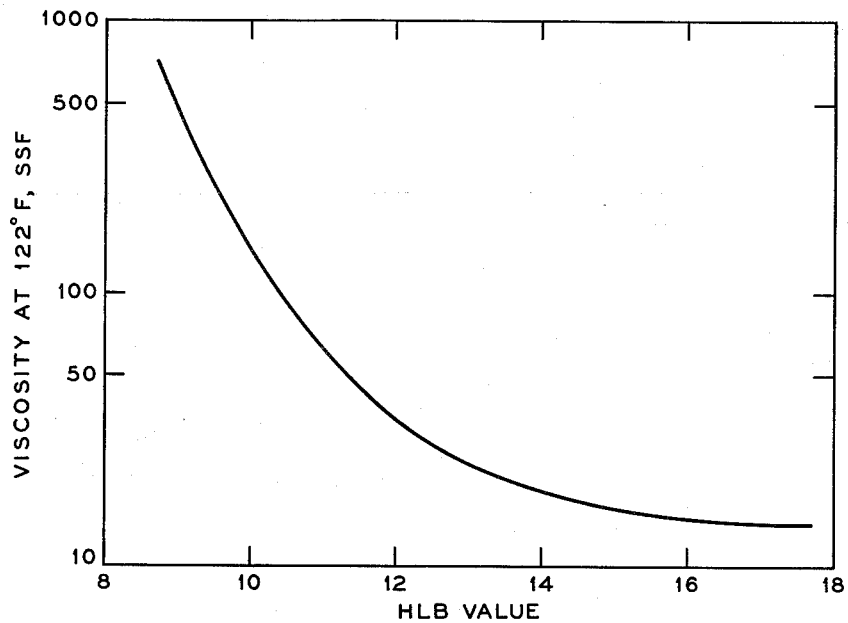

INVENTORS
JAMES R. WRIGHT
EDWARD W. MERTENS

INVENTORS
JAMES R. WRIGHT
EDWARD W. MERTENS

United States Patent Office 2,993,002
Patented July 18, 1961

2,993,002
PREPARATION OF ASPHALT EMULSIONS
James R. Wright and Edward W. Mertens, El Cerrito, Calif., assignors to California Research Corporation, San Francisco, Calif., a corporation of Delaware
Filed Sept. 25, 1957, Ser. No. 686,191
1 Claim. (Cl. 252—311.5)

This invention relates to a new method for preparing asphalt emulsions having improved properties. More particularly, the invention is concerned with a novel process for preparing high residue anionic asphalt emulsion having improved viscosity characteristics.

Asphalt, also known as bitumen, is important for a number of uses. Such uses include the paving of roads and other surfaces and the production of waterproof and protective coatings. Asphalt is also employed to impregnate fibrous materials such as paper or felt, thereby enhancing their physical properties.

Asphalt is generally employed in the form of liquids of three main types of three main types. In one common form it is softened by heating and applied as a molten mass. By properly controlled temperatures, the molten asphalt is given the desired viscosity to coat or penetrate and adhere to the treated materials. In a second form, asphalt is commonly combined with volatile organic solvents to provide a liquid solution of appropriate viscosity known as liquid asphalts or "asphalt cutbacks." After the solution has been applied, the solvent is evaporated to leave the asphalt in place. In its third main form asphalt is emulsified with water and employed as a liquid asphalt emulsion. These emulsions are of both stable and unstable varieties. The stable type emulsions are commonly referred to as "mixing grade emulsions," and the unstable type emulsions are known as "quick breaking asphalt emulsions." The latter type emulsions separate on contact with the materials being treated with the asphalt, and the water is removed leaving the asphalt. Such asphalt emulsions, which are the form of asphalt to which the present invention relates, have several advantages over molten asphalts and liquid asphalts. Expensive heating equipment to melt and control the temperature of the asphalt is unnecessary. The added high cost of volatile organic solvents and the fire hazards involved by their use are avoided.

The preparation of asphalt emulsions is usually carried out by mixing the asphalt with an aqueous solution of an alkali metal hydroxide such as sodium hydroxide or potassium hydroxide to saponify certain high molecular weight carboxylic acids in the asphalt. Such acids may occur naturally in the asphalt, or they may be added whenever the natural acid content is unsatisfactorily low. The saponification provides soaps which serve as emulsifying agents when the asphalt and water of the aqueous solution are mixed together to produce asphalt emulsions. Asphalt emulsions of this type are classified as anionic in nature, because the alkali metal soap emulsifying agents obtained by saponification with alkali metal hydroxide bear a negative charge and are attracted to the positive pole, or anode, in electrolytic solution.

The viscosity of asphalt emulsions is most important and a fundamental property. Since asphalt emulsions are usually applied today by machinery, it is important that the emulsions have a low viscosity and flow freely. Suitably low viscosities in the asphalt emulsions are also desirable for better penetrability in coating and impregnating applications. It is also equally important that the viscosity of the asphalt emulsions should be sufficiently high to provide proper retentivity of the asphalt on the material to be coated or impregnated. If the viscosity of the emulsion is too low, a substantial proportion of the asphalt will run off of the treated material and will thereby be wasted.

Other desirable properties in combination with the proper viscosity of the asphalt emulsion include the maintenance of a high residue in order to avoid the necessity for handling unduly large amounts of emulsion in a particular application. It is also important that the asphalt emulsions possess a certain stability, because the separation of the asphalt and aqueous phases and the resulting increased viscosities which may occur during storage make the emulsions difficult to apply. However, it is essential that where the emulsion is used for seal coat work and similar applications it should separate or "break" rapidly on contact with the aggregate or stone chips to be treated in the coating applications. In other cases, such as those where thorough mixing of the emulsion with the aggregate or where penetration of an emulsion into felt or paper is desired, the emulsions must be stable enough to resist breaking until the desired degree of mixing or penetration is achieved. It is these properties of the asphalt emulsions in contact with aggregate, felt and paper to be coated or impregnated which give them the name of "quick breaking asphalt emulsions." The asphalt emulsions should likewise demulsify quickly in the presence of electrolytes, such as calcium chloride, which are often used to accelerate the "breaking" of the emulsion.

It has now been found that improved high residue anionic asphalt emulsions of controlled viscosity are prepared by the steps of increasing and decreasing the viscosity of the emulsion as desired which comprise incorporating in said emulsions from 0.05 to 2.0 percent by weight of nonionic emulsifier having an HLB within the range of from 1 to 20, nonionic emulsifier in the lower HLB range of about 8 and below being incorporated to provide emulsions of increased viscosity and nonionic emulsifier in the upper HLB range above about 8 being incorporated to provide emulsions of decreased viscosity.

The novel process for producing improved asphalt emulsions according to this invention provides remarkably low viscosity asphalt emulsions compared to untreated emulsions of unsatisfactorily high viscosity in which the appropriate high HLB nonionic emulsifiers have not been incorporated. On the other hand, emulsions which ordinarily are undesirably low in viscosity are greatly improved by the incorporation of nonionic emulsifier in the low HLB range to provide a suitably high viscosity asphalt emulsion having proper retentivity for coating and other treating operations.

In addition to their improved viscosity characteristics, the asphalt emulsions prepared in accordance with the present invention also have excellent stability under storage conditions and do not increase unduly in viscosity or separate on standing. Their demulsibility and quick-breaking properties are particularly satisfactory. The asphalt emulsions of decreased viscosity prepared according to the invention are also characterized by desirably high residues.

According to the present invention, suitable anionic asphalt emulsions are prepared by mixing hot molten asphalt with a hot aqueous solution of an alkali metal hydroxide having a concentration within the range of from about 0.01 to about 2.0 percent by weight of alkali metal hydroxide. For present purposes potassium hydroxide, particularly in concentrations of 0.05 to 0.30, is preferred. Usually from 40 to 80 percent of asphalt is employed with from 20 to 60 percent of water.

The nonionic emulsifier is employed in the anionic asphalt emulsion in accordance with the invention in any proportion sufficient to increase or decrease the viscosity of the emulsion as desired. Preferably, from about 0.05 to about 2.0 percent by weight is used based on the total emulsion. The nonionic emulsifier may be added to either the aqueous alkali metal hydroxide solution or to the asphalt prior to mixing. It may also be added to the anionic asphalt emulsions after they are formed. However, the most effective control of viscosity is obtained by adding the nonionic emulsifier to the alkali metal hydroxide solution prior to mixing with the asphalt.

Nonionic emulsifying agents are well known as a class. Their main characteristic which distinguishes them from other emulsifiers is the fact that they do not contain an ionizable group and have no electric charge, unlike negatively charged anionic emulsifiers and positively charged cationic emulsifiers. However, nonionic emulsifiers are like emulsifying agents in general in that they possess a mixture of polar and non-polar groups in their molecules. The polar groups constitute the water-soluble or hydrophilic end of the emulsifier and are usually made up of several hydroxyl groups or ether linkages. The non-polar groups are the oil-soluble or lipophilic end of the molecule and ordinarily consist of hydrocarbon radicals which may be saturated, unsaturated, aliphatic or aryl in nature.

Emulsifying agents of the nonionic type include esters such as the polyhydric alcohol monoesters of long chain fatty acids. Both lower polyhydric alcohols such as glycerol and higher polyols or ether alcohols, for example, nonaethylene glycol, are used in the esters. The lower alcohol group usually means that the lipophilic nature of the emulsifier molecule will predominate while the hydrophilic characteristics of the molecule predominate in the case of the higher alcohols. Esters such as sorbitan monolaurate, sorbitan trioleate, pentaethylene glycol sorbitan monopalmitate and decaethylene glycol stearate are illustrative.

In addition to the polyhydric alcohol esters, there are also nonionic emulsifiers of the fatty alcohol type such as oxyethylated lauryl alcohol. Another example of this type of compound is the polyethylene glycol tertiary dodecyl thioether having an average of 6 to 8 polyethylene glycol units. The fatty acid amides, for example, lauroyl diethanolamide, are another type of nonionic emulsifier.

Illustrative nonionic emulsifiers in the process according to this invention may be visualized by the simple formula P-Hydrocarbon where P is a polar group such as $$H(OCH_2CH_2)_nO\overset{\overset{O}{\|}}{C}$$

in the case of polyglycol esters, $$H(OCH_2CH_2)_nS\text{—}$$

for polyglycol thioethers, $$H(OCH_2CH_2)_nO\text{—}$$

in the case of polyglycol ethers, and $$\underset{\underset{\text{OH}}{|}}{CH_2}\underset{\underset{\text{OH}}{|}}{CH}\underset{\underset{\diagdown}{}}{CH}\underset{\underset{\text{OH}}{|}}{CH}CH CH_2 O\overset{\overset{O}{\|}}{C}\text{—}$$

for sorbitan esters.

In the above formulae the "Hydrocarbon" is saturated, unsaturated, aliphatic or aryl in nature, as mentioned before, and $n$ is an integer indicating the number of ethylene glycol units.

The nonionic emulsifying agents, like other emulsifiers, are commonly classified for convenience according to their hydrophilic lipophilic balance, usually abbreviated HLB. The method employed in this classification provides a certain HLB number for each surface active agent. The numbers give a range of HLB values from 1+ to 20— where the 1+ represents extermely nonpolar emulsifiers and 20— corresponds to higher polar emulsifiers. Briefly described, the HLB value for any certain emulsifier is based on the following formula:

(I)  $$HLB = 20\left(1 - \frac{S}{A}\right)$$

where S is the ester saponification number and A is the acid number of saponified acid, and (II)  $$HLB = \frac{E+P}{5}$$

where E is the weight percent of alkoxy content (for example, ethoxy) and P is the weight percent polyol content.

Formula I is for ester type nonionic surfactants. The term $$\frac{S}{A}$$

is actually a fractional representation of the weight percentage of fatty acid (lipophilic) material in the molecule. Formula II is for nonionics of either fatty acid ester or fatty alcohol ether types and is based on the weight percentage of polyol and the weight percentage of alkylene oxide, such as ethylene oxide, in the molecule. When no polyhydric alcohol other than polyglycol is present, this formula is simplified to $$HLB = \frac{E}{5}$$

The approximate HLB of any given nonionic is also readily determined by the following chart based on the effect of adding the nonionic emulsifier to water.

| Behavior when added to water: | HLB range |
|---|---|
| No dispersibility in water | 1–4 |
| Poor dispersion | 3–6 |
| Milky dispersion after vigorous agitation | 6–8 |
| Stable milky dispersion | 8–10 |
| From translucent to clear dispersion | 10–13 |
| Clear solution | 13+ |

Although the above description of the nonionic emulsifiers and their classification according to the HLB system is sufficient for the practice of this invention, further details may be found in the text entitled, "Principles of Emulsion Technology," by Becher, published 1955 by Reinhold Publishing Corporation, New York, New York. This text discloses various nonionic agents at pages 64 to 67, inclusive, and discusses the HLB method at pages 105 to 109, inclusive.

Since asphalt emulsions of too high viscosity are more of a problem than those of too low viscosity, the process of the present invention finds its greatest utility in the use of upper HLB nonionics, above 8, to decrease the viscosity. This constitutes a preferred embodiment of the invention.

A wide variety of asphalts are suitable in the preparation of the superior asphalt emulsion according to the process of this invention. Asphalts which normally contain sufficient high molecular weight carboxylic acids to provide emulsions upon saponification of the acids with aqueous alkali metal hydroxide solutions are preferred. It is possible, however, to increase or decrease the amount of high molecular weight carboxylic acid in the asphalt and provide more or less saponified carboxylic acid emulsifying agent where that is desirable.

In a typical preparation, the aqueous alkali metal hydroxide emulsifying base is mixed with the asphalt at a temperature in the range of from about 120 to 180° F. Where colloid mills are employed, the temperatures may be raised to 300° F. or more. It is essential that the asphalt be in a molten state prior to mixing. Usually, temperatures of around 300° F. are sufficient, but the exact temperature will depend on the softening point of the particular asphalt employed in preparing the emulsion.

In a further illustration of the greatly improved high residue anionic asphalt emulsions prepared by the process of the invention, a series of emulsions was prepared and tested, as outlined in the following paragraphs.

All of the emulsions were prepared in 2,500-gram quantities in a steam-heated, stainless steel vessel equipped with a 1,725 r.p.m. stirrer, temperature gauge, condenser and electrically heated asphalt reservoir.

The aqueous phase consisting of distilled water, alkali metal hydroxide and the specified nonionic emulsifier is made up in the vessel and brought to a temperature of 160° F. with continuous stirring. Simultaneously, the asphalt is put into the asphalt reservoir and brought to a temperature of 250° F. When both the aqueous and asphalt phases are at the desired temperatures, the asphalt is added to the aqueous phase over a three-minute period. Following an additional 30 seconds stirring period, the emulsion is withdrawn into a one-gallon glass jar. The glass jar is covered and placed in a 120° F. oven for overnight storage prior to testing.

The asphalt employed in the tests was a typical Venezuelan asphalt of 200 to 250 penetration. The emulsions were formulated with 58% by weight asphalt, potassium hydroxide, nonionic emulsifier and the balance water, as indicated in the table below.

The viscosity in seconds, Saybolt Furol for 60 mls. at 122° F. and the demulsibility were determined according to the "Standard Methods of Testing Emulsified Asphalts," ASTM designation D–244–55. The demulsibility of a particular emulsion is the percentage by weight of the asphalt present that fails to pass a No. 14 wire cloth when a 100-gram sample of the emulsion is mixed with 35 mls. of 0.02 N calcium chloride solution. The residue test determines the percent by weight of residue which remains after a 25-gram sample of the emulsion is heated until all of the water is evaporated.

In the table of test results, the various nonionic emulsifiers employed in the tests are referred to by numbers as follows:

(1) Polyethylene glycol tertiary alkyl thioether containing an average of 6 to 8 polyethylene glycol units and a tertiary dodecycl alkyl group.

(2) Polyethylene glycol monosterate having an average of approximately 5 ethylene glycol units.

(3) Polyethylene glycol monosterate having an average of approximately 50 ethylene glycol units.

(4) Polyethylene glycol ether of octylphenol with an average of about one glycol group.

(5) Polyethylene glycol ether of octylphenol with an average of about 30 glycol groups.

(6) Polyethylene glycol ether of octylphenol with an average of about 20 glycol groups.

(7) Polyethylene glycol ether of octylphenol with an average of about 3 glycol groups.

(8) Sorbitan trioleate.

(9) Sorbitan tristearate.

(10) Sorbitan monooleate.

(11) Sorbitan monopalmitate.

(12) Polyoxyethylene sorbitan trioleate, a proprietary product having an HLB of 11.0, manufactured by Atlas Powder Company under the name of Tween 85.

(13) Polyoxyethylene sorbitan monopalmitate, a proprietary product having an HLB of 15.6, manufactured by Atlas Powder Company under the name of Tween 40.

(14) Polyoxyethylene stearate, a proprietary product having an HLB of 17.9, manufactured by Atlas Powder Company under the name of Myrj 53.

In the examples of asphalt emulsions in the following table, the KOH concentration was 0.155 percent by weight unless otherwise specified.

Table

| Variable Components—Nonionic Additive and Amount, Percent | | HLB Number of Nonionic Component | Viscosity, SSF, at 122° F. | Properties | | | | | |
|---|---|---|---|---|---|---|---|---|---|
| | | | | Demulsibility (0.02 N CaCl₂) | Residue, Percent | Particle Size (μ) | | Storage Stability, 1 Week at 160° F. | |
| (A) | (B) | | | | | Range | Predominant | Viscosity | Demulsibility, Percent |
| None ᵃ | None ᵃ | | 870 | 97 | 57.6 | 0.5–15 | 5 | 1,250 | 100 |
| (1) 0.35 ᵃ | None ᵃ | 13 | 119 | 74 | 58.0 | 0.5–6 | 2.5 | 102 | 77 |
| None ᵇ | None ᵇ | | 440 | 99 | 56.8 | 1–6 | 4 | 99 | 98 |
| (1) 0.40 ᵇ | None ᵇ | 13 | 62 | 79 | 56.8 | 1–4 | 2 | 30 | 74 |
| None ᶜ | None ᶜ | | 149 | 97 | 60.4 | 1–8 | 2 | 255 | 93 |
| (1) 0.15 ᶜ | None | 13 | 58 | 94 | 57.2 | 1–4 | 1.0 | Broken | Broken |
| None | None | | 280 | 100 | 57.2 | 1–8 | 4 | 423 | 96 |
| (2) 0.27 | (3) 0.03 | 9.5 | 27 | 100 | 58.4 | 1–5 | 2 | 19 | 94 |
| (2) 0.15 | (3) 0.15 | 13.2 | 20 | 58 | 56.8 | ½–2 | 1 | 17 | 47 |
| (2) 0.03 | (3) 0.27 | 16.8 | 14 | 70 | 55.3 | ½–15 | 1 | 15 | 69 |
| None | (3) 0.30 | 17.7 | 14 | 81 | 56.4 | 1–5 | 2 | 16 | 82 |
| None | None | | 255 | 98 | 56.8 | 0.5–7 | 4 | 226 | 98 |
| (4) 0.35 | None | 4.9 | 602 | 98 | 57.2 | 0.5–7 | 2.5 | 435 | 90 |
| (5) 0.24 | None | 17.5 | 25 | 81 | 57.2 | 1–6 | 3 | 16 | 62 |
| (7) 0.27 | (6) 0.03 | 9.7 | 206 | 100 | 56.8 | 1–6 | 3.5 | 78 | 99 |
| (7) 0.15 | (6) 0.15 | 12.7 | 63 | 66 | 57.2 | ½–4 | 1.5 | 25 | 44 |
| None | None | | 270 | 97 | 57.6 | 1–12 | 5 | 239 | 97 |
| (8) 0.30 ᵈ | None | 1.8 | 547 | 95 | 56.8 | 1–7 | 3.5 | 148 | 97 |
| (8) 0.30 | None | 1.8 | 457 | 62 | 59.6 | 0.5–7 | 2 | 114 | 38 |
| (9) 0.30 | None | 2.1 | 428 | 74 | 59.6 | 0.5–5 | 2 | 97 | 40 |
| (10) 0.30 | None | 4.3 | 512 | 80 | 58.8 | 0.5–3 | 2 | 254 | 56 |
| (11) 0.30 | None | 6.7 | 594 | 70 | 60.0 | 0.5–3 | 2 | 196 | 43 |
| (13) 0.30 | None | 11.0 | 228 | 97 | 58.0 | 1–12 | 5 | 211 | 92 |
| (15) 0.30 | None | 15.6 | 19 | 63 | 59.2 | 1–5 | 1.5 | 18 | 58 |
| (16) 0.30 | None | 17.9 | 14 | 80 | 59.2 | 1–20 | 4 | 18 | 78 |

ᵃ 0.06% KOH, in water phase.
ᵇ 0.18% KOH, in water phase.
ᶜ 0.24% KOH, in water phase.
ᵈ Nonionic added to asphalt phase.

The above test results show that the addition of nonionic emulsifiers to anionic asphalt emulsions results in asphalt emulsions having any desired viscosity irrespective of the initial viscosity of the asphalt emulsion without the nonionic. Asphalt emulsions of undesirably high viscosity show a remarkable decrease in viscosity with the addition of nonionics having HLB values above about 8. On the other hand, asphalt emulsions which are unsuitably low in viscosity show a desirable increase with the addition of nonionics having HLB's of about 8 and below. It is also apparent from the test results that the higher the HLB of the nonionic emulsifier additive, the greater the decrease in viscosity of the asphalt emulsion. Conversely, the lower HLB's provide greater increases in viscosities.

The viscosities of the asphalt emulsions having nonionic emulsifiers incorporated therein in accordance with the process of this invention, not only have improved viscosities but possess remarkably stable characteristics as shown by their viscosities and demulsibility after a week in storage. The emulsions are also shown to have satisfactorily high residues. This combination of high residues and controlled viscosity means that the emulsions are outstandingly effective in coating and impregnating applications.

Figure 2:
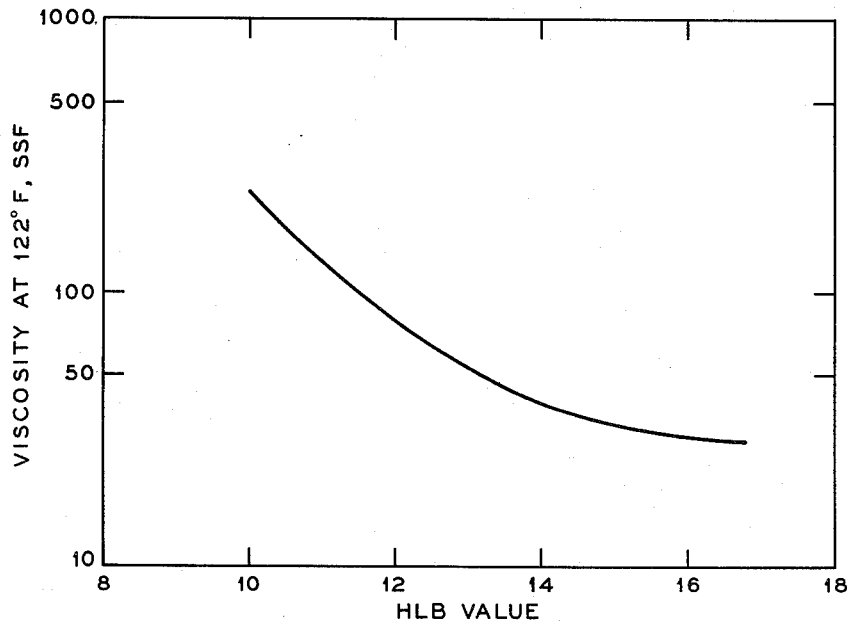
Figure 3:
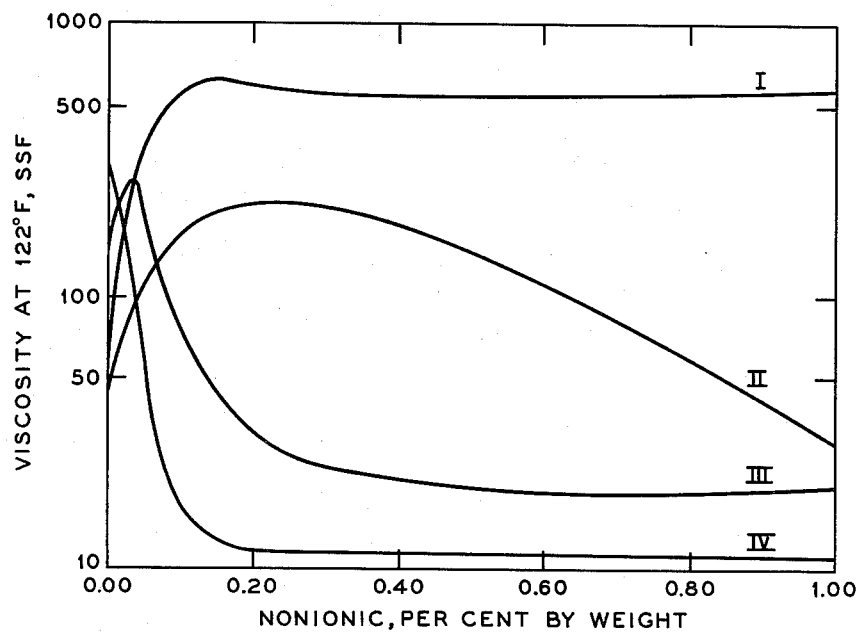

In further illustration of the process for preparing improved anionic asphalt emulsions in accordance with this invention, representative test data have been ploted to give the graphs of the accompanying drawings. In FIG. 1 the graph provides a visual appreciation of the effect observed in variations of HLB by adding a combination of nonionic emulsifiers designated as (2) and (3) in the above description. The graph shows that as the HLB value increases above 8, the viscosity of the emulsion undergoes a remarkable decrease. In FIG. 2 a similar graph is obtained by plotting HLB variations derived from a combination of emulsifiers (6) and (7). FIG. 3 of the drawings shows graphs obtained by plotting the concentration by weight of various nonionic emulsifiers having different HLB values against the observed viscosities. Graph I illustrates the increase in viscosities obtained with various proportions of emulsifier (8) having a low HLB of 1.8. Graph II shows the intermediate effect on viscosities of emulsions by adding different proportions of a nonionic emulsifier, sorbitan monolaurate, having an HLB of 8.6. Graph III illustrates a remarkable decrease in viscosity of the asphalt emulsion when nonionic emulsifier (13), having an HLB of 15.6, is added in various proportions to the asphalt emulsion. Graph IV shows an even greater decrease in the viscosity of asphalt emulsions by the addition of various proportions of additive (3) having an HLB of 17.7.

We claim:

In the preparation of improved high residue anionic soap asphalt emulsions of controlled viscosity the step of raising the viscosity which consists in incorporating in said emulsion from 0.05 to 2.0 percent by weight of polyethylene glycol ether of octylphenol with an average of about one glycol group, said anionic soap asphalt emulsion being prepared by mixing from 40 to 80 percent by weight of molten asphalt with from 20 to 60 percent by weight of aqueous solution of 0.05 to about 0.30 percent by weight of potassium hydroxide so as to saponify high molecular weight carboxylic acids in the asphalt, the aforesaid proportions being based on the total emulsion.

References Cited in the file of this patent

UNITED STATES PATENTS

| | | |
|---|---|---|
| 2,635,055 | Figdor | Apr. 14, 1953 |
| 2,701,777 | Farris | Feb. 8, 1955 |
| 2,706,688 | Sommer et al. | Apr. 19, 1955 |

OTHER REFERENCES

Atlas Guide to the Use of Sorbitol and Surfactants in Cosmetics; pub. by Atlas Powder Co., pages 14–16, 31 (1956).

Griffin: "The American Perfumer and Essential Oil Review," May 1955, pages 26–29.